(12) United States Patent
Higurashi

(10) Patent No.: US 11,568,857 B2
(45) Date of Patent: Jan. 31, 2023

(54) MACHINE LEARNING METHOD, AUDIO SOURCE SEPARATION APPARATUS, AND ELECTRONIC INSTRUMENT

(71) Applicant: CASIO COMPUTER CO., LTD., Tokyo (JP)

(72) Inventor: Daiki Higurashi, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 153 days.

(21) Appl. No.: 16/979,594

(22) PCT Filed: Mar. 12, 2019

(86) PCT No.: PCT/JP2019/010059
§ 371 (c)(1),
(2) Date: Sep. 10, 2020

(87) PCT Pub. No.: WO2019/176950
PCT Pub. Date: Sep. 19, 2019

(65) Prior Publication Data
US 2021/0074267 A1    Mar. 11, 2021

(30) Foreign Application Priority Data

Mar. 14, 2018    (JP) .............................. JP2018-046691

(51) Int. Cl.
*G10L 15/06* (2013.01)
*G10L 15/16* (2006.01)
*G10L 15/26* (2006.01)

(52) U.S. Cl.
CPC ............ *G10L 15/063* (2013.01); *G10L 15/16* (2013.01); *G10L 15/26* (2013.01)

(58) Field of Classification Search
CPC ....... G10L 15/063; G10L 15/16; G10L 15/26; G10L 25/18; G10L 25/30; G10L 21/0308;
(Continued)

(56) References Cited

U.S. PATENT DOCUMENTS 6,675,140 B1 * 1/2004 Irino ....................... G06F 17/14
704/211
6,718,306 B1 * 4/2004 Satoh ...................... G10L 17/00
704/251
(Continued)

FOREIGN PATENT DOCUMENTS

JP    H05127698 A    5/1993
WO    2019031410 A1    2/2019

OTHER PUBLICATIONS

International Search Report (ISR) dated May 21, 2019 issued in International Application No. PCT/JP2019/010059.
(Continued)

*Primary Examiner* — Michael Colucci
(74) *Attorney, Agent, or Firm* — Holtz, Holtz & Volek PC

(57) ABSTRACT

A machine learning method for training a learning model includes: transforming a first audio type of audio data into a first image type of image data, wherein a first audio component and a second audio component are mixed in the first audio type of audio data, and the first image type of image data corresponds to the first audio type of audio data; transforming a second audio type of audio data into a second image type of image data, wherein the second audio type of audio data includes the first audio component without mixture of the second audio component, and the second image type of image data corresponds to the second audio type of audio data; and performing machine learning on the learning model with training data including sets of the first image type of image data and the second image type of image data.

17 Claims, 13 Drawing Sheets

(58) Field of Classification Search
CPC ....... G10H 2210/056; G10H 2250/311; G10H 1/0008; G06N 3/0454; G06N 3/0472; G06N 3/084; G06F 17/10; G06K 9/46
See application file for complete search history.

(56) References Cited

U.S. PATENT DOCUMENTS

| | | | | |
|---|---|---|---|---|
| 8,411,977 | B1* | 4/2013 | Baluja | G06K 9/00523 |
| | | | | 382/240 |
| 9,299,364 | B1* | 3/2016 | Pereira | G10L 25/51 |
| 9,640,159 | B1* | 5/2017 | Tcheng | G10H 1/0008 |
| 10,296,638 | B1* | 5/2019 | Chen | G06F 16/68 |
| 10,621,973 | B1* | 4/2020 | McVicker | H04R 1/14 |
| 2007/0256540 | A1* | 11/2007 | Salter | G09B 15/06 |
| | | | | 84/485 R |
| 2010/0131086 | A1* | 5/2010 | Itoyama | G10H 3/125 |
| | | | | 703/2 |
| 2016/0196343 | A1* | 7/2016 | Rafii | G06F 16/632 |
| | | | | 707/730 |
| 2018/0152799 | A1* | 5/2018 | Fraundorf | H04R 29/008 |
| 2018/0276540 | A1* | 9/2018 | Xing | G06N 3/084 |

OTHER PUBLICATIONS

Japanese Office Action (and English translation thereof) dated Aug. 6, 2019 issued in Japanese Application No. 2018-046691.
Japanese Office Action (and English translation thereof) dated May 21, 2019 issued in Japanese Application No. 2018-046691.
Written Opinion dated May 21, 2019 issued in International Application No. PCT/JP2019/010059.
Doi, et al., "Sound Generation Model Using Deep Learning (SNDGAN: The generative model of sounds using Generative Adversarial Networks)", 30th Annual Conference of the Japan Society of Artificial Intelligence, Jun. 2016, pp. 1-3.
Omachi, et al., "Blind Source Separation using Associative Memory Model and Linear Separation Filter", IPSJ SIG Technical Reports, Feb. 2015, vol. 2015-SLP-105, No. 4, pp. 1-6.

* cited by examiner

MACHINE LEARNING METHOD, AUDIO SOURCE SEPARATION APPARATUS, AND ELECTRONIC INSTRUMENT

TECHNICAL FIELD

The present disclosure relates to an audio processing technique.

BACKGROUND ART

Conventionally, there exist electronic keyboard instruments that teach which keys should be pressed by lighting LEDs (Light Emitting Diodes) embedded in their keyboard corresponding to pitches for a certain part such as a melody part in MIDI (Musical Instrument Digital Interface) based musical data, for example, a SMF (Standard MIDI File). According to such an electronic keyboard instrument, a lesson functionality of lighting keys to teach melodies for music desired by a user to play can be implemented.

In data consisting of codes arranged in chronological order, for example, a MIDI data having a channel number attached such as a SMF, a melody pitch, a sound length or the like for an extracted certain part can be presented to a user.

Meanwhile, research and development for artificial intelligence utilizing machine learning such as neural networks is widespread. For example, research and development for audio processing techniques utilizing neural networks is also conducted.

SUMMARY OF INVENTION

One aspect of the present disclosure relates to a machine learning method for training a learning model, comprising:
transforming, by at least one processor, a first audio type of audio data into a first image type of image data, wherein a first audio component and a second audio component are mixed in the first audio type of audio data, and the first image type of image data corresponds to the first audio type of audio data and has one axis of multiple axes as a logarithmic frequency axis;
transforming, by at least one processor, a second audio type of audio data into a second image type of image data, wherein the second audio type of audio data includes the first audio component without mixture of the second audio component, and the second image type of image data corresponds to the second audio type of audio data and has one axis of multiple axes as a logarithmic frequency axis; and
performing, by at least one processor, machine learning on the learning model with training data including sets of the first image type of image data and the second image type of image data.
wherein the performing the machine learning on the learning model comprises training the learning model to generate second image data from first image data, and the first image data is image data that is of a same type as the first image type and different from the first image type of image data and is not included in the training data, and the second image data is of a same type as the second image type and different from the second image type of image data and is not included in the training data.

Another aspect of the present disclosure relates to an audio source separation apparatus, comprising:
a memory that stores a trained model generated with machine learning; and
at least one processor,
wherein at least one processor is configured to:
transform a first audio type of audio data into a first image type of image data, wherein a first audio component and a second audio component are mixed in the first audio type of audio data, and the first image type of image data corresponds to the first audio type of audio data and has one axis of multiple axes as a logarithmic frequency axis;
supply the transformed first image type of image data to the trained model;
acquire the second image type of image data from the trained model; and
separate the first audio component based on the acquired second image type of image data.

Another aspect of the present disclosure relates to an electronic instrument having a keyboard wherein respective keys are luminescent, comprising:
a memory that stores a trained model generated with machine learning; and
at least one processor configured to transform a first audio type of audio data into a first image type of image data, wherein a first audio component and a second audio component are mixed in the first audio type of audio data, and the first image type of image data corresponds to the first audio type of audio data and has one axis of multiple axes as a logarithmic frequency axis, supply the transformed first image type of image data to the trained model to acquire the second image type of image data from the trained model, separate the first audio component based on the acquired second image type of image data, and light keys on the keyboard in accordance with the separated first audio component.

Another aspect of the present disclosure relates to an audio source separation model generation apparatus, comprising:
a memory that stores a learning model to be trained with machine learning; and
at least one processor,
wherein at least one processor is configured to:
acquire training data including a first audio type of audio data and a second audio type of audio data, wherein a first audio component and a second audio component are mixed in the first audio type of audio data, and the second audio type of audio data includes the first audio component without mixture of the second audio component;
transform the acquired first audio type of audio data into a first image type of image data;
transform the acquired second audio type of audio data into a second image type of image data; and
generate a trained model to supply second image data from first image data by machine learning with training data including sets of the transformed first image type of image data and the transformed second image type of image data, wherein the first image data is of a same type as the first image type and is not included in the training data, and the second image data is of a same type as the second image type and is not included in the training data.

Another aspect of the present disclosure relates to an audio source separation method for separating audio with a trained model stored in a memory, comprising:
acquiring, by at least one processor, a first audio type of audio data, wherein a first audio component and a second audio component are mixed in the first audio type of audio data;
transforming, by at least one processor, the acquired first audio type of audio data into a first image type of image data, wherein the first image type of image data corresponds to the first audio type of audio data and has one axis of multiple axes as a logarithmic frequency axis;

supplying, by at least one processor, the transformed first image type of image data to the trained model;

acquiring, by at least one processor, the second image type of image data from the trained model; and separating, by at least one processor, the first audio component based on the acquired second image type of image data.

DESCRIPTION OF EMBODIMENTS

Figure 1:
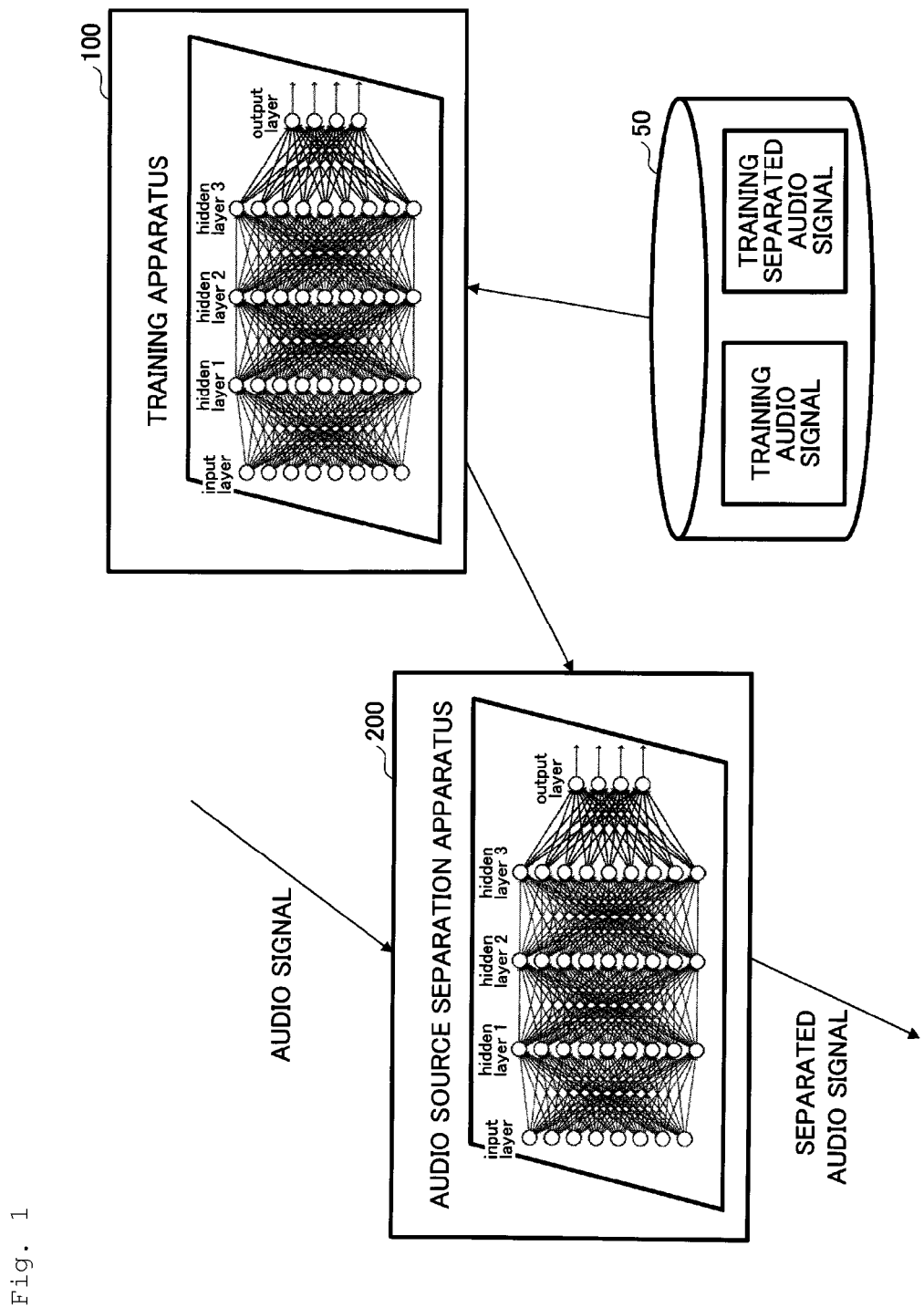
FIG. 1 is a schematic diagram for illustrating an audio source separation apparatus having a trained audio source separation model according to one embodiment of the present disclosure.

In the following embodiments, an audio processing technique is disclosed for training an audio source separation model for separating a certain type of instrumental sound or a vocal sound (a certain audio component) from audio data and using the trained model to separate a relevant part from audio data.

In the following description, there are cases where a learning audio source separation model is referred to as a learning model and a trained audio source separation model is referred to as a trained model. Also, there are cases where audio source separation may be referred to as acoustic separation.

A training apparatus according to the present disclosure acquires a set of training audio data made up from many sets of audio data including multiple audio components and audio data specifying a certain audio component, transforms the set of training audio data into a set of image data through audio image transformation operations for transforming acoustic data (audio data) into a spectrogram (image data that has a frequency axis and a time axis as a vertical axis and a horizontal axis, respectively, and pixel colors corresponding to signal intensities), and trains an audio source separation model with the set of image data. In this embodiment, an image transformation scheme resulting in a logarithmic frequency axis such as a constant Q transformation is particularly used for audio image transformation operations instead of an image transformation scheme resulting in a linear frequency axis such as a common Fourier transform. In other words, the image transformation scheme having a logarithmic frequency axis is used so that a lower frequency band including a larger amount of tobe-separated audio components can have a higher resolution than a higher frequency band and features of a frequency distribution (a frequency distribution such that even if a frequency of fundamental tone changes due to variations in pitches, harmonic components for the fundamental tone cannot be changed) specific to a type of musical instrument or a human being (or an individual) instead of pitches can be more effectively shown. Also, an audio source separation apparatus according to the present disclosure acquires audio data including multiple audio components, transforms the audio data into image data in accordance with an image transformation scheme having a logarithmic frequency axis, supplies the image data to a trained audio source separation model provided from a training apparatus, acquires separation image data showing a certain audio component and transforms the separation image data into audio data having the certain audio component extracted.

Note that the term "image data" used herein is any information that may be represented as a two-dimensional array, and implementations stored in a memory or implementations of cases where information stored in the memory is displayed on a screen do not need to be implementations that human beings can visually recognize as images but may be any type of implementations as long as a machine can recognize them as a two-dimensional array.

First, an audio source separation apparatus having a trained audio source separation model according to one embodiment of the present disclosure is described with reference to FIG. 1. FIG. 1 is a schematic diagram for illustrating an audio source separation apparatus having a trained audio separation model according to one cm-bodiment of the present disclosure.

As illustrated in FIG. 1, an audio source separation apparatus 200 according to one embodiment of the present disclosure has, but is not limited to, an audio source separation model implemented as a neural network and uses an audio source separation model trained by a training apparatus 100 to generate audio data by separating a certain audio component from incoming audio data including multiple audio components. The training apparatus 100 according to one embodiment of the present disclosure trains an audio source separation model with a set of training audio data including multiple audio components and the corresponding separation audio data showing a certain audio component stored in a database 50 and provides the trained audio source separation model to the audio source separation apparatus 200.

Figure 2:
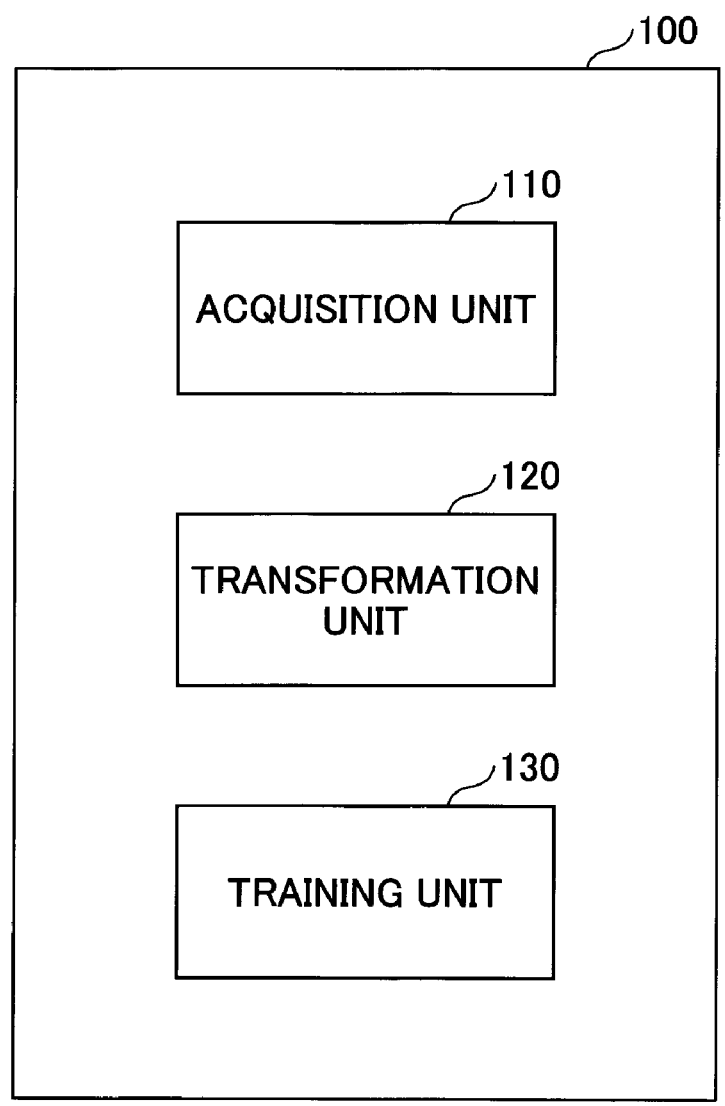
FIG. 2 is a block diagram for illustrating a functional arrangement of a training apparatus according to one embodiment of the present disclosure.

Next, a training apparatus according to one embodiment of the present disclosure is described with reference to FIGS. 2-4. FIG. 2 is a block diagram for illustrating a functional arrangement of a training apparatus according to one embodiment of the present disclosure.

As illustrated in FIG. 2, the training apparatus 100 has an acquisition unit 110, a transformation unit 120 and a training unit 130.

The acquisition unit 110 acquires training data including audio data including multiple audio components and separation audio data showing a certain audio component. Specifically, the acquisition unit 110 acquires a large number of sets of the audio data including multiple audio components and the separation audio data as the training data from the database 50. For example, the training data may be sets of audio data consisting of mixture of an accompaniment sound and a vocal sound and audio data consisting of only the vocal sound. Alternatively, the training data may be sets of audio data consisting of mixture of an accompaniment sound and a vocal sound and audio data consisting of only the accompaniment sound. Typically, the training data may consist of a data set including several thousands to ten thousands of sets. Also, in one embodiment, the multiple audio components may be audio components showing certain frequency distributions, and fundamental tones of the audio components change while distributions of harmonic components of the fundamental tones fall within certain ranges. Also, in one embodiment, the multiple audio components may be a certain type of instrumental sound or a vocal sound and may be audio components that belong to an instrumental sound or a vocal sound having a same type of tone, although their pitches are different.

The transformation unit 120 transforms the mixed audio data including multiple audio components and the separation audio data showing a certain audio component into respective image data. In one embodiment of the present disclosure, the image transformation may be performed in accordance with an image transformation scheme resulting in a logarithmic frequency axis such as constant Q transform. In other words, the transformation unit 120 may transform the respective audio data into three-dimensional spectrograms representing a time, a frequency and an intensity of an audio component in accordance with the constant Q transform. Specifically, image data according to one embodiment of the present disclosure may be implemented as a data array including data components in multiple dimensions such as a three-dimensional spectrogram.

Figure 3A:
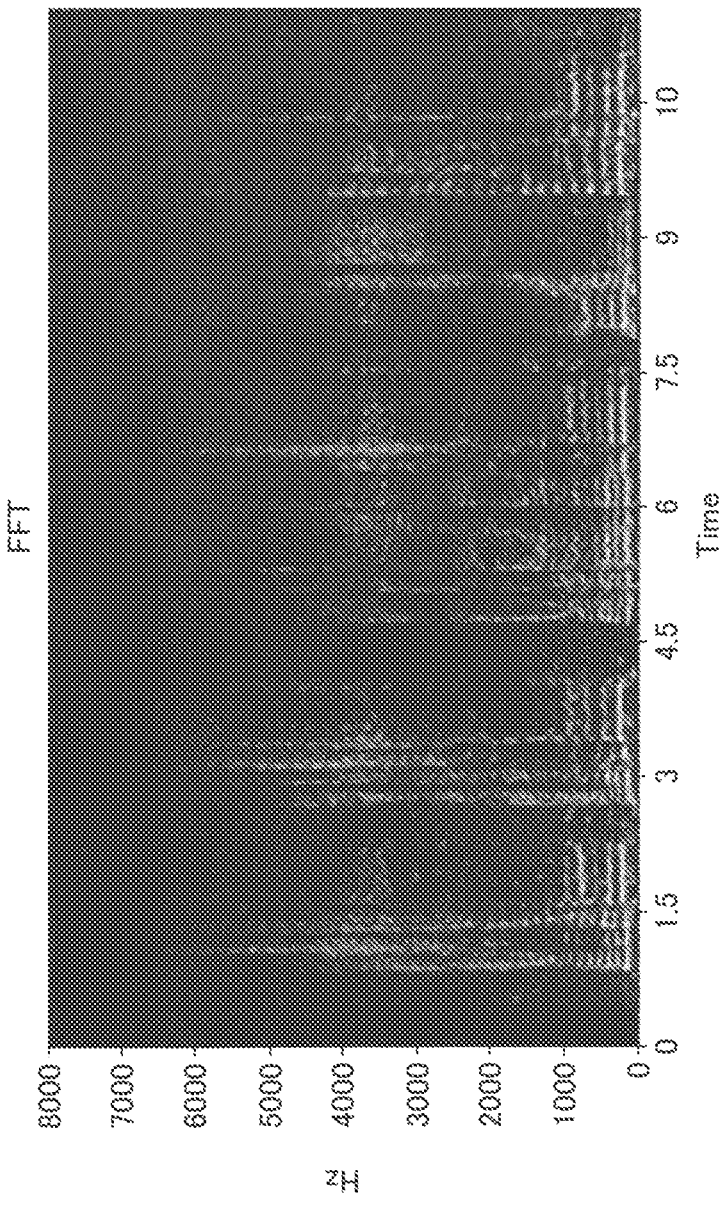
FIG. 3A is a diagram for illustrating spectrograms obtained by Fourier transforming and constant Q transforming audio data according to one embodiment of the present disclosure.
Figure 3B:
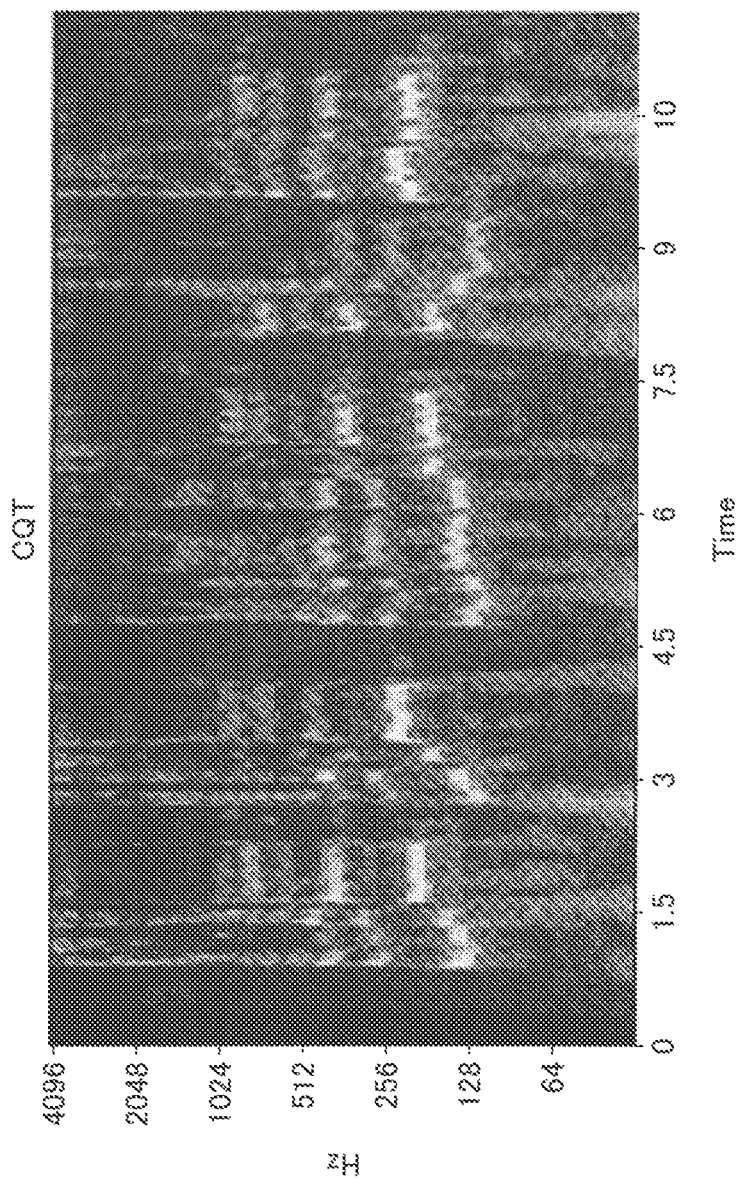
FIG. 3B is a diagram for illustrating spectrograms obtained by Fourier transforming and constant Q transforming audio data according to one embodiment of the present disclosure.

According to the image transformation scheme resulting in a logarithmic frequency axis such as the constant Q transform, a lower frequency band can be imaged with a higher resolution than a higher frequency band. For example, FIGS. 3A and 3B illustrate spectrograms acquired by performing Fourier transform and the constant Q transform on audio data, respectively. As illustrated in FIG. 3A, for the audio data, most of signal components appear in a frequency band of less than 5000 Hz while few signal components appear in a high frequency band higher than 5000 Hz. Although many of principal sounds such as an instrumental sound and a vocal sound are generally included in a frequency band of less than 1000 Hz, a lower frequency band is illustrated with a lower resolution in the spectrogram as illustrated in FIG. 3A, and the particularly important frequency band of 1000 Hz is imaged with an insufficient resolution. On the other hand, in the spectrogram as illustrated in FIG. 3B, a frequency band of less than 4096 Hz is imaged with a relatively high resolution, and a lower frequency band, where signal components appear, can be imaged in more details. The resolution is higher in the particularly important frequency band of 1000 Hz. Thus, if the spectrograms are treated as images, the constant Q transform enables the lower frequency band for audio data to be represented with a higher resolution than the Fourier transform and is accordingly suitable for machine learning utilizing neural networks for image data as described below.

The training unit 130 trains an audio source separation model (learning model) for separating audio data showing a certain audio component with mixture image data imaged from audio data including multiple audio components and separation image data imaged from separation audio data to generate a trained audio source separation model (trained model).

Note that the above learning model has a data structure such as a neural network that can be learned with a learning program for neural networks. However, the trained model may have a data structure such as a neural network that can be executed with an executable program for neural networks, but equivalent functions may be implemented in the form of converted program codes and data that can be executed with generic programs such as C language.

An audio source separation model according to one embodiment of the present disclosure may be implemented as a convolutional neural network (CNN), and the training unit 130 supplies training mixture image data, which is imaged from mixed audio data including multiple audio components, to the CNN and adjusts various parameters for the CNN to approximate output images from the CNN to separation image data corresponding to the mixture image data. In general, the CNN includes a convolutional layer to extract features of a local area in image data for different areas. For example, the training unit 130 performs convolutional operations on local time and frequency areas in the mixture image data to extract the features needed to separate respective audio components in a convolutional layer and generates image data resulting from extraction of a certain audio component in an inverse convolutional layer. As the features automatically extracted with machine learning using the CNN, for example, it is expected that a formant pattern or features similar to the formant pattern may be extracted, and the CNN is configured to include formants. Also, instead of automatic extraction of all features with the machine learning, a portion of feature extraction operations may be manually manipulated to extract the formant pattern as the features. In other words, it is basically difficult for a human being to logically derive and predict the features that may be automatically extracted with the machine learning, but there are some cases where such manual manipulation may improve a training speed or a training accuracy, for the features (the formant pattern in the present case) that can be described as being logically valid beforehand. For example, in the present case, a fundamental formant pattern for a local area is extracted with a lower convolutional layer whereas a formant pattern for the whole frequency specific to an individual audio component such as a vocal sound is extracted in an upper convolutional layer.

For example, the training unit 130 supplies a spectrogram transformed from the training audio data consisting of mixture of an accompaniment sound and a vocal sound with the constant Q transform to the CNN, compares an output spectrogram from the CNN with a spectrogram transformed from the corresponding training audio data, and updates parameters for the CNN to reduce an error between these spectrograms.

In one embodiment, the audio source separation model may be implemented with the CNN including a pooling layer to allow for displacement in addition to the convolutional layer to conduct the above-stated image transformation. Specifically, the convolutional layer serves to extract feature information for image data per local time and frequency area while the pooling layer serves to modify displacement across the local areas. As a result, for example, a difference between tones (distributions of harmonic components) can be extracted as feature information while allowing for variations of pitches (displacement in a frequency direction), or an error of image data due to displacement of a spectrogram in a time direction can be allowed. The allowance of displacement enables the displacement to be allowed more effectively, because the frequency axis is scaled as a logarithmic axis instead of a linear axis.

Also in one embodiment, the training unit 130 may generate an audio source separation model in accordance with GANs (Generative Adversarial Networks). Specifically, the training unit 130 may have a generator implemented as a neural network for converting incoming training mixture image data into separation image data and a discriminator implemented as a neural network for calculating, upon receiving the separation image data supplied from the generator and the training separation image data, their output values and learn parameters for the neural networks of the generator and the discriminator based on an error of the output values.

Figure 4:
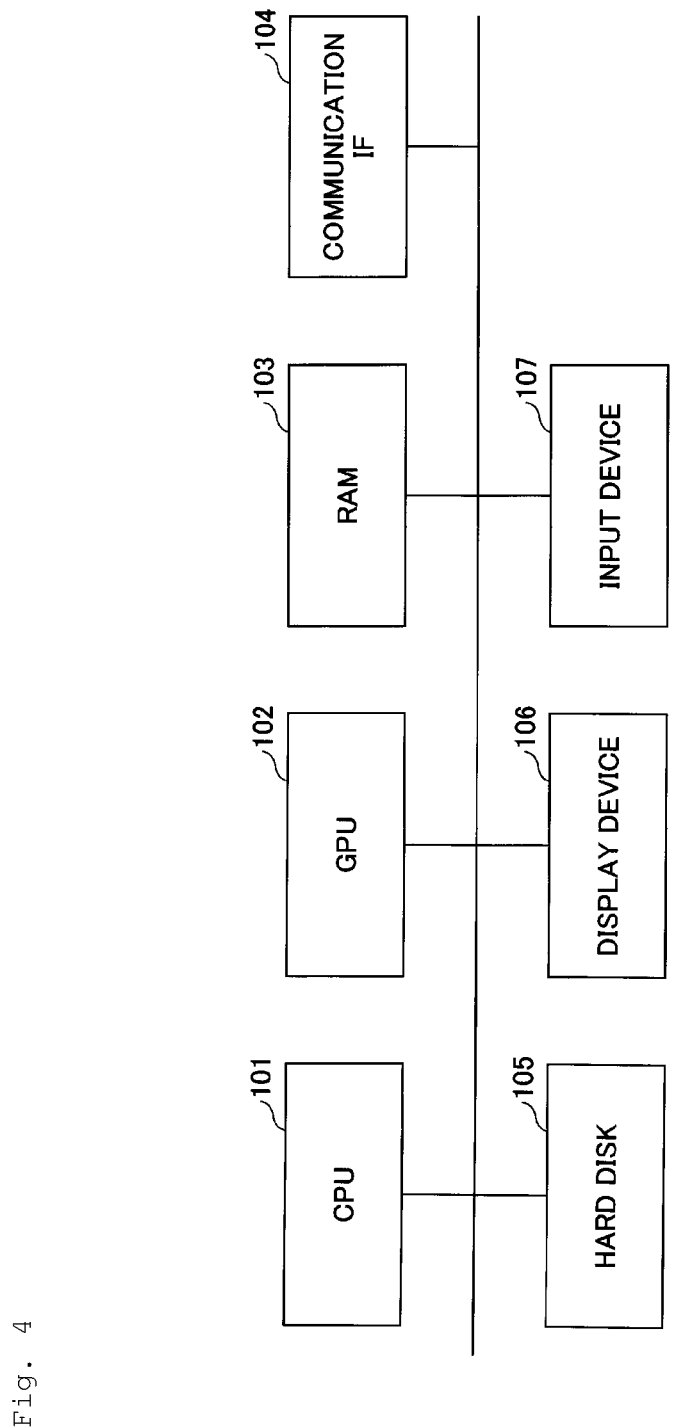
FIG. 4 is a block diagram for illustrating a hardware arrangement of the training apparatus according to one embodiment of the present disclosure.

As illustrated in FIG. 4, the training apparatus 100 may have a hardware arrangement with a CPU (Central Processing Unit) 101, a GPU (Graphics Processing Unit) 102, a RAM (Random Access Memory) 103, a communication interface (IF) 104, a hard disk 105, a display device 106 and an input device 107, for example. The CPU 101 and the GPU 102 perform various operations for the training apparatus 100 as stated below and serve as at least one processor or at least one controller that implements the acquisition unit 110, the transformation unit 120 and the training unit 130 as stated above. Particularly, the CPU 101 controls execution of the training operations in the training apparatus 100, and the GPU 102 performs the training operations such as matrix calculation or the like for machine learning. The RAM 103 and the hard disk 105 serve as memories for storing various data and programs for the training apparatus 100. Particularly, the RAM 103 serves as a working memory for storing working data for the CPU 101 and the GPU 102, and the hard disk 105 stores control programs and/or training data for the CPU 101 and the GPU 102. The communication IF 104 is a communication interface for acquiring the training data from the database 50. The display device 106 displays various information items such as contents, progress, results and so on for the operations, and the input device 107 is a device for inputting information and data such as a keyboard, a mouse or the like. However, the training apparatus 100 according to the present disclosure is not limited to the above-stated hardware arrangement and may have any other appropriate hardware arrangement.

Figure 5:
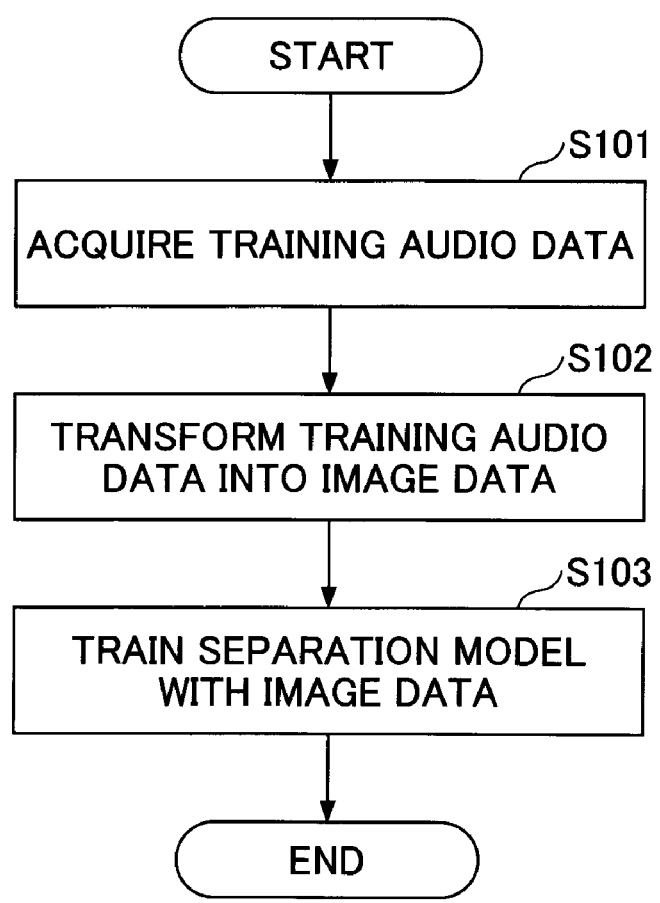
FIG. 5 is a flowchart for illustrating a training operation for an audio source separation model according to one embodiment of the present disclosure.

Next, training operations at the training apparatus 100 according to one embodiment of the present disclosure are described with reference to FIGS. 5 and 6. FIG. 5 is a flowchart for illustrating a training operation for an audio source separation model according to one embodiment of the present disclosure.

As illustrated in FIG. 5, at step S101, the acquisition unit 110 acquires training data including mixture audio data including multiple audio components and separation audio data showing a certain audio component. Specifically, the acquisition unit 110 acquires a large number of training data sets of the mixture audio data and the separation audio data from the database 50. For example, the mixture audio data may be audio data consisting of mixture of an accompaniment sound and a vocal sound, and the separation audio data may be audio data consisting of only the vocal sound.

At step S102, the transformation unit 120 transforms the mixture audio data and the separation audio data into mixture image data and separation image data, respectively, in accordance with an image transform scheme resulting in a logarithmic frequency axis. Specifically, the transformation unit 120 transforms the mixture audio data and the separation audio data in accordance with the constant Q transform to acquire a mixture spectrogram and a separation spectrogram, respectively. The spectrograms acquired with the constant Q transform have a higher resolution in a lower frequency band than a higher frequency band and are thus preferable to separate an audio component concentrated in the lower frequency band in the spectrogram through image analyses utilizing neural networks.

At step S103, the training unit 130 trains au audio source separation model for separating separation image data from mixture image data with the mixture image data and the separation image data. Specifically, the training unit 130 configures the audio source separation model with a CNN and learns parameters for the CNN with training image data. For example, the training unit 130 extracts features needed to separate respective audio components such as formants by performing convolutional operations on a local time and frequency range for the mixture image data in a convolutional layer of the CNN and generates image data resulting from separation of a certain audio component in an inverse convolutional layer. After that, the training unit 130 compares the generated image data with training separation image data and adjusts parameters for the CNN to reduce an error between these pieces of image data.

Then, the training unit 130 may perform the above-stated training operation on a predetermined number of training datasets and determine the finally acquired CNN as a trained audio source separation model. Alternatively, the training unit 130 may determine the CNN acquired at the time point of the acquired error falling below a predetermined threshold as the trained audio source separation model.

Figure 6:
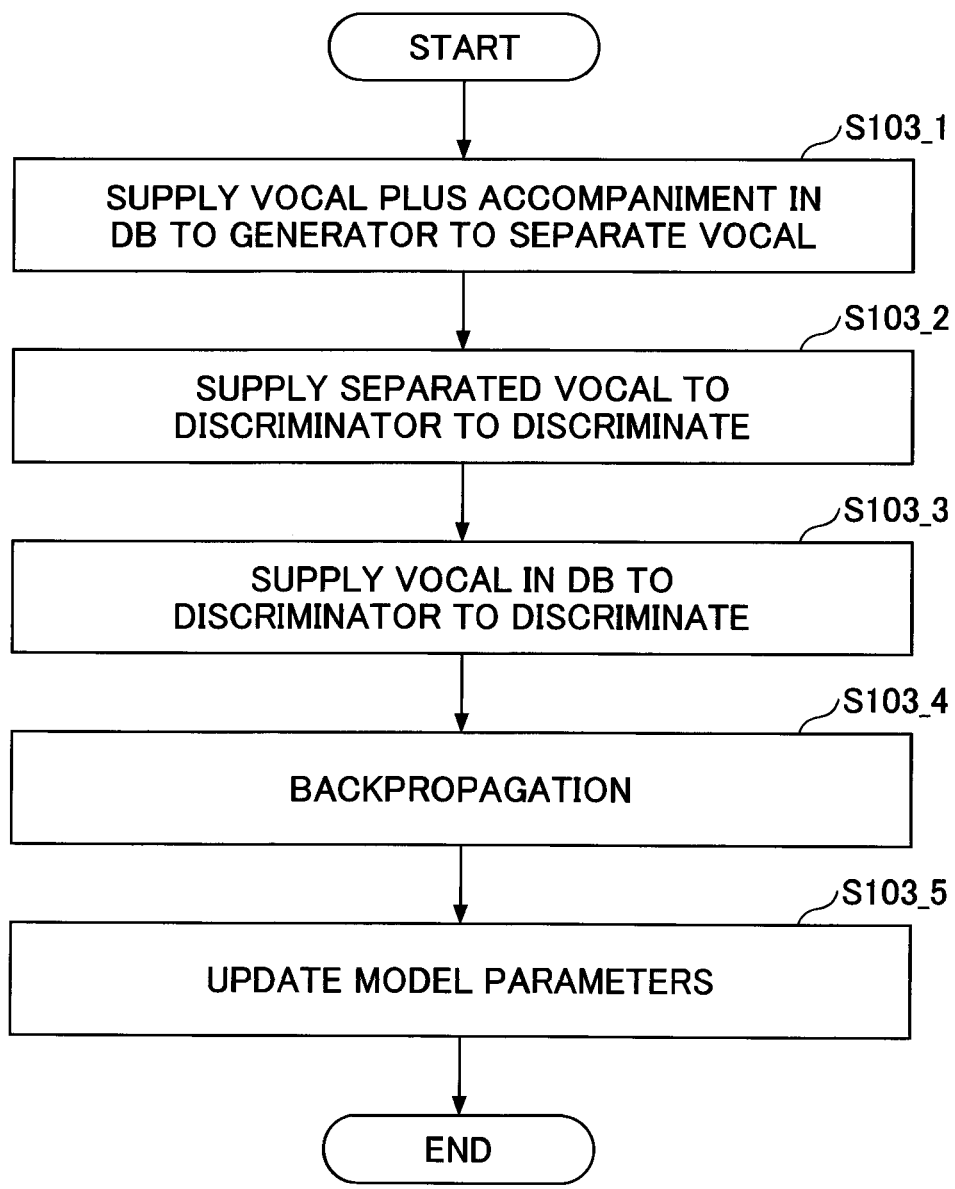
FIG. 6 is a flowchart for illustrating details of the training operation for the audio source separation model according to one embodiment of the present disclosure.

In one embodiment, as illustrated in FIG. 6, the training unit 130 may generate the audio source separation model in accordance with GANs scheme. In the present embodiment, the training unit 130 may have a generator implemented as a neural network for converting incoming training mixture image data into separation image data and a discriminator implemented as a neural network for calculating output values for the separation image data supplied from the generator and training separation image data. Then, the training unit 130 may adjust parameters for the neural networks of the generator and the discriminator based on feedback information from the discriminator such as an error between the output values. In the embodiment as illustrated in FIG. 6, the mixture audio data is audio data consisting of mixture of an accompaniment sound and a vocal sound, and the separation audio data is audio data consisting of the vocal sound. However, the present disclosure is not limited to the above, and the mixture audio data may include any multiple audio components, and the separation audio data may be any audio component.

As illustrated in FIG. 6, at step S103_1, the training unit 130 supplies the training mixture audio data to the generator to acquire vocal audio data.

At step S103_2, the training unit 130 supplies the vocal audio data acquired from the generator to the discriminator to acquire an output value indicative of identified features or the like.

At step S103_3, the training unit 130 supplies training vocal audio data acquired from the database 50 to the discriminator to acquire an output value indicative of identified features or the like.

At step S103_4, the training unit 130 calculates an error between the acquired two output values and performs backpropagation on the neural networks of the generator and the discriminator based on the error.

At step S103_5, the training unit 130 updates parameters for the neural networks of the generator and the discriminator in accordance with execution results of the backpropagation.

Figure 7A:
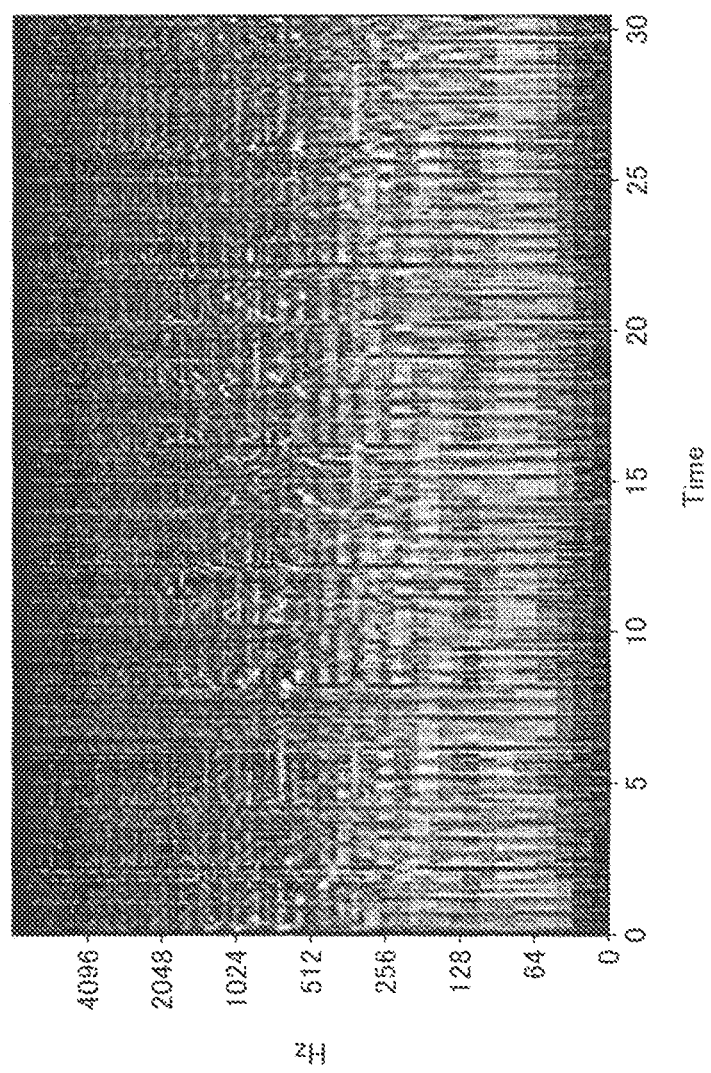
FIG. 7A is a diagram of spectrograms for audio data and separation audio data according to one embodiment of the present disclosure.
Figure 7B:
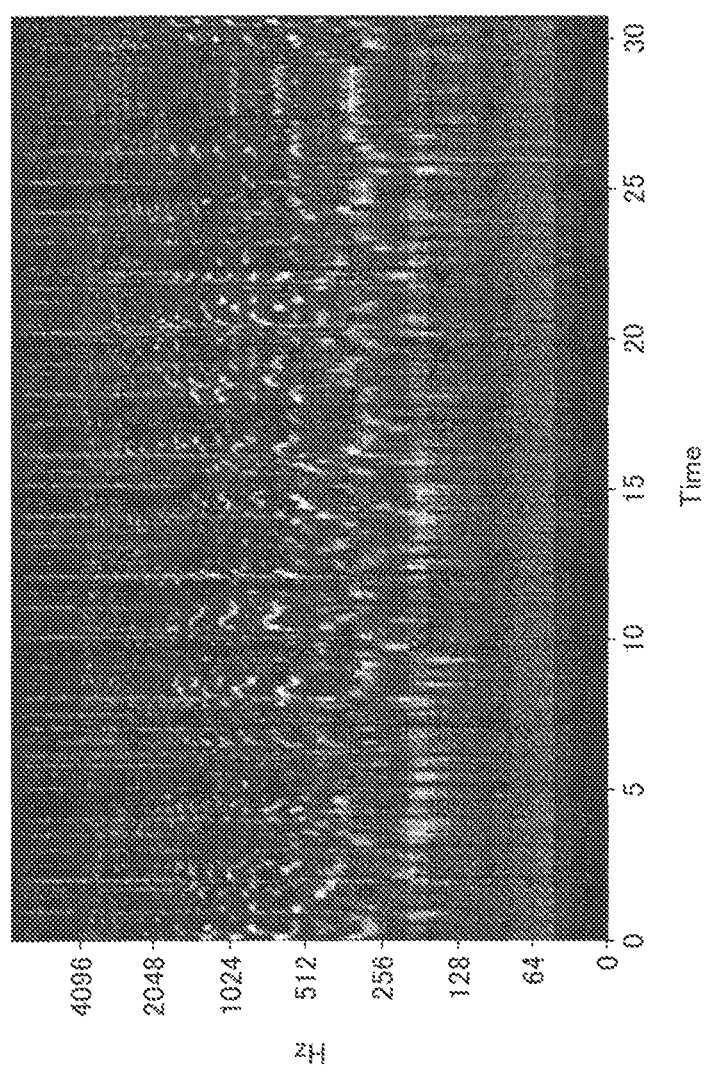
FIG. 7B is a diagram of spectrograms for audio data and separation audio data according to one embodiment of the present disclosure.

According to the above-stated training operations, the training apparatus 100 can separate a vocal spectrogram as illustrated in FIG. 7B from a training mixture spectrogram as illustrated in FIG. 7A, for example. In the separation vocal spectrogram, most of audio components appear in a lower frequency band of less than 1000 Hz, and separation performance can be improved by using constant Q transformed spectrograms that enable the lower frequency band to be imaged with a higher resolution than in imaging with Fourier transformed spectrograms.

Figure 8:
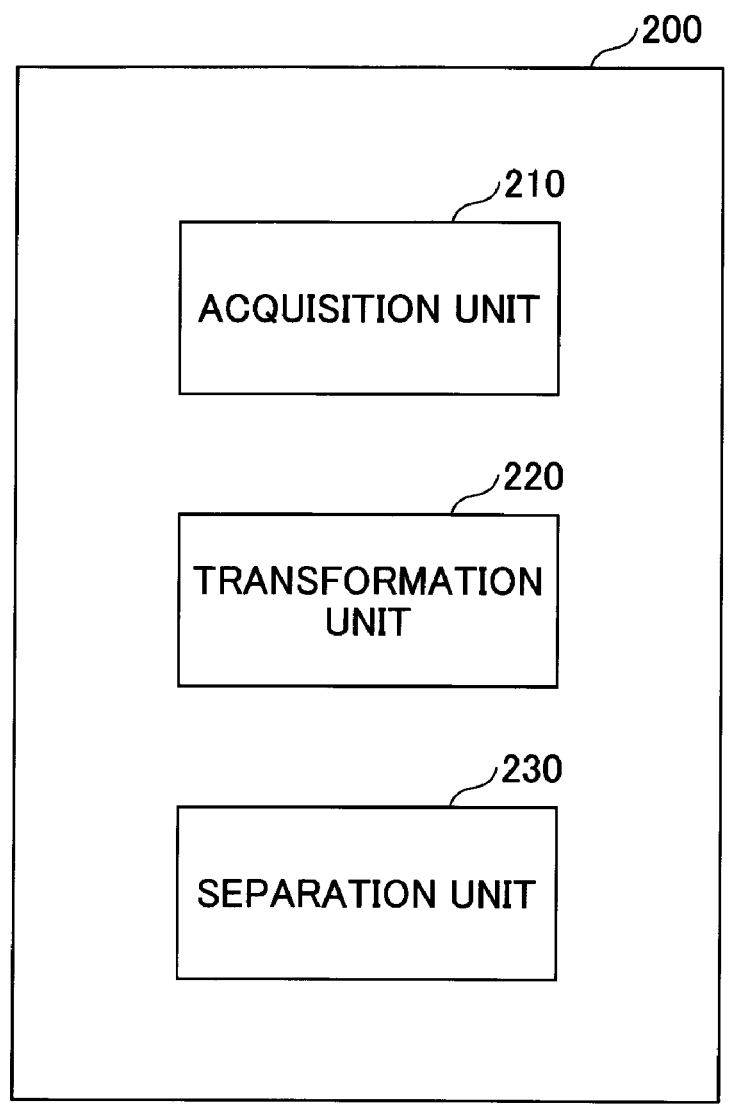
FIG. 8 is a block diagram for illustrating a functional arrangement of an audio source separation apparatus according to one embodiment of the present disclosure.

Next, an audio source separation apparatus according to one embodiment of the present disclosure is described with reference to FIGS. 8 and 9. FIG. 8 is a block diagram for illustrating a functional arrangement of an audio source separation apparatus according to one embodiment of the present disclosure.

As illustrated in FIG. 8, the audio source separation apparatus 200 has an acquisition unit 210, a transformation unit 220 and a separation unit 230. The audio source separation apparatus 200 has a trained audio source separation model provided from the training apparatus 100 and uses the audio source separation model to separate audio data showing a certain audio component from mixture audio data.

The acquisition unit 210 acquires mixture audio data including multiple audio components. For example, the mixture audio data may be audio data consisting of mixture of an accompaniment sound and a vocal sound and may be generally unknown audio data unlike training audio data as stated above in conjunction with the training apparatus 100.

The transformation unit 220 transforms the mixture audio data into image data in accordance with an image transform scheme resulting in a logarithmic frequency axis. Specifically, the transformation unit 220 may divide the mixture audio data into frames, each of which is extracted per a predetermined number of samples, and perform the constant Q transform on each of the frames sequentially to acquire spectrograms for the respective frames.

The separation unit 230 supplies the image data to the trained audio source separation model to acquire separation image data showing a certain audio component from the audio source separation model and separates the certain audio component based on the separation image data. Specifically, the separation unit 230 uses the trained audio source separation model from the trained apparatus 100 to acquire a separation spectrogram showing an audio component separated from a spectrogram for the mixture audio data. The separation spectrogram may be a spectrogram representing vocal audio data separated from the mixture audio data consisting of the accompaniment sound and the vocal sound.

Figure 9:
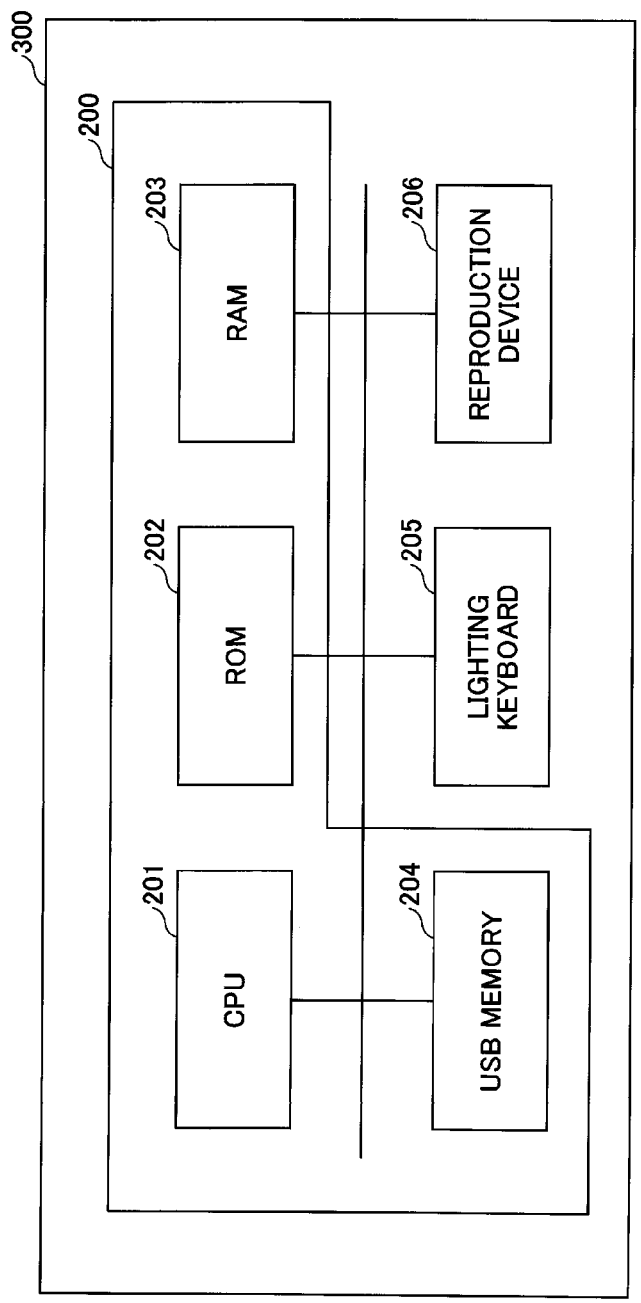
FIG. 9 is a block diagram for illustrating a hardware arrangement of an audio source separation apparatus and an electronic instrumental apparatus according to one embodiment of the present disclosure.

Here, as illustrated in FIG. 9, the audio source separation apparatus may have a hardware arrangement with a CPU 201, a ROM (Read-Only Memory) 202, a RAM 203 and a USB (Universal Serial Bus) memory port 204, for example. Furthermore, the electronic instrumental apparatus 300 may have a hardware arrangement with the audio source separation apparatus 200, a lighting keyboard 205 and a reproduction device 206. The CPU 201 performs various operations stated below for the audio source separation apparatus 200 and serves as at least one processor or at least one controller that implements the acquisition unit 210, the transformation unit 220 and the separation unit 230 as stated above. The ROM 202 and the RAM 203 serve as a memory that stores various data and programs at the audio source separation apparatus 200. Particularly, the RAM 203 serves as a working memory that stores working data for the CPU 201, and the ROM 203 stores control programs and/or data for the CPU 201. The USB memory port 204 acquires reproduction data stored in a USB memory mounted by a user. In response to an instruction from the CPU 201, the lighting keyboard 205 extracts pitches for an audio component separated from reproduction data and lights a keyboard in accordance with the extracted pitches. The reproduction device 206 releases musical sounds generated from the reproduction data in accordance with instructions from the CPU 201. However, the audio source separation apparatus 200 and the electronic instrumental apparatus 300 according to the present disclosure are not limited to the above-stated hardware arrangement and may have any other appropriate hardware arrangement. For example, one or more of the acquisition unit 210, the transformation unit 220 and the separation unit 230 as stated above may be implemented in an electronic circuit such as a filtering circuit.

In one embodiment, the separation unit 230 may supply frame-wise spectrograms to the audio source separation model sequentially to acquire frame-wise separation spectrograms for vocal sounds and extract the most strongly pronounced frequency portion at each time point for the respective spectrograms, that is, a frequency portion that corresponds to a frequency having the largest amplitude in the spectrogram and is shown at the highest luminance, as the pitch at this time point. In this manner, the separation unit 230 can extract the separated vocal pitch. For example, in the spectrogram as illustrated in FIG. 3B, the extracted vocal pitches are not constant and fluctuate. Also, there is a case where the pitches may be out of musical scales of equal temperament that can emit sounds with usual keyboard instruments. Accordingly, the separation unit 230 may average fluctuating pitches within a frame and perform digitalization of musical scores such that the pitches can be in the closest musical scales of equal temperament. Here, the digitalization of musical scores is to generate sequence data where the pitch is made a MIDI note number and the tone corresponds to temporal data between a note-on and a note-off and is to generate SMF data, for example. In this manner, the separation unit 230 can light keys for a melody line corresponding to vocal pitches simultaneously with emitting sounds of the generated musical score data as a musical piece using a normal sequencer reproduction scheme.

Also in other embodiments, the audio source separation model may be to separate accompaniment audio data from the mixture audio data consisting of mixture of an accompaniment sound and a vocal sound. Then, the training apparatus 100 may use lossless Fourier transform instead of the constant Q transform. In this case, the transformation unit 220 would divide the mixture audio data into frames per a predetermined number of samples and perform the Fourier transform on the respective frames sequentially to acquire frame-wise spectrograms as well as to store phase spectrograms acquired during the transform. The separation unit 230 supplies the frame-wise spectrograms to the audio source separation model sequentially to acquire frame-wise spectrograms for separated accompaniment sounds and uses the stored phase spectrograms to perform inverse Fourier transform on the separation spectrograms to acquire audio data where the accompaniment sounds are separated. The acquired audio data can be reproduced with a normal audio data reproduction procedure.

Figure 10:
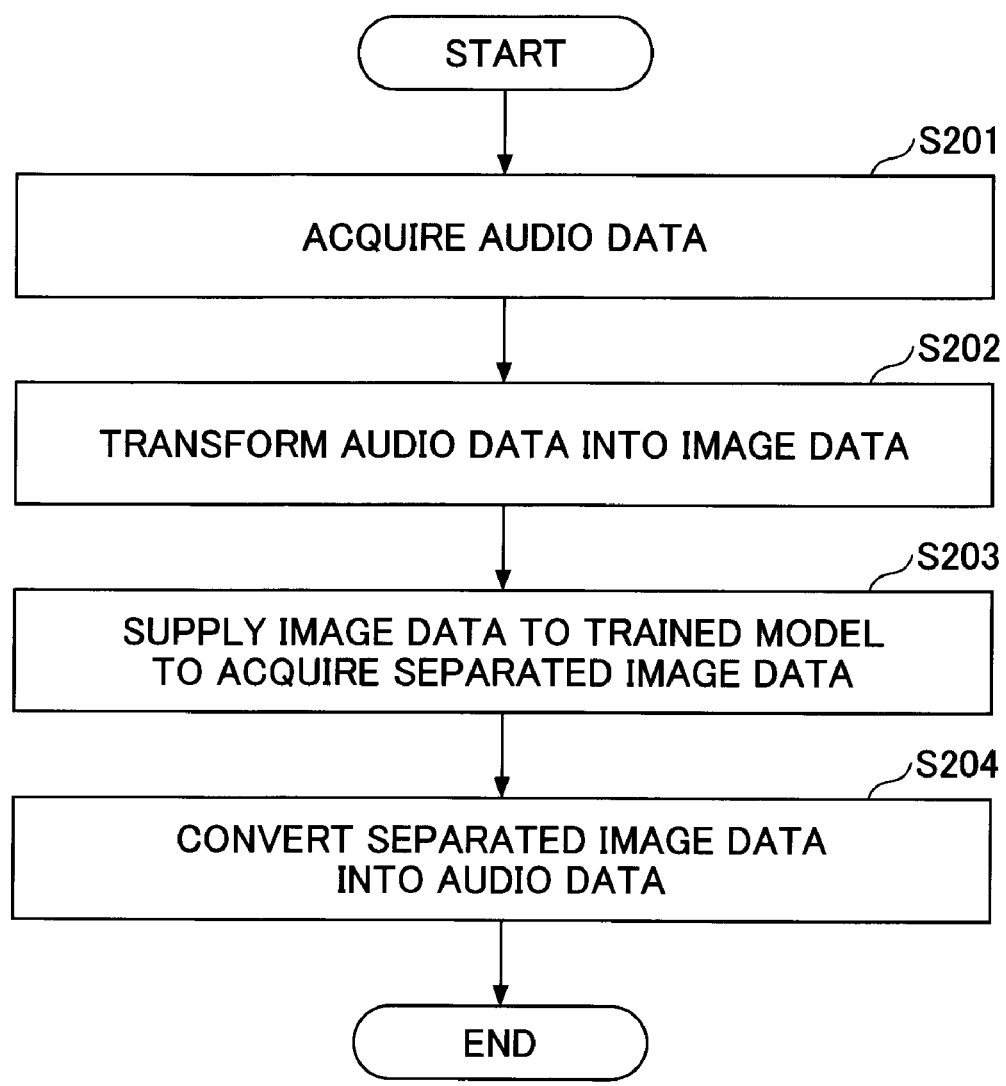
FIG. 10 is a flowchart for illustrating an audio source separation operation according to one embodiment of the present disclosure.

Next, an audio source separation operation at the audio source separation apparatus 200 according to one embodiment of the present disclosure is described with reference to FIGS. 10 and 11. FIG. 10 is a flowchart for illustrating an audio source separation operation according to one embodiment of the present disclosure.

As illustrated in FIG. 10, at step S201, the acquisition unit 210 acquires mixture audio data including multiple audio components. Specifically, the acquisition unit 210 acquires reproduction data provided from a user as the mixture audio data. For example, the mixture audio data may be audio data consisting of mixture of an accompaniment sound and a vocal sound.

At step S202, the transformation unit 220 transforms the mixture audio data into mixture image data in accordance with an image transform scheme resulting in a logarithmic frequency axis. Specifically, the transformation unit 220 transforms the mixture audio data in accordance with the constant Q transform to acquire a mixture spectrogram. The spectrogram acquired in accordance with the constant Q transform is of a higher image resolution in a lower frequency band than in a higher frequency band and is preferable to separate an audio component concentrated in the lower frequency band in the spectrogram with image analyses using a neural network.

At step S203, the separation unit 230 supplies the mixture image data to a trained audio source separation model to acquire separation image data showing a certain audio component from the audio source separation model and separates the certain audio component based on the separation image data. For example, the separation unit 230 may extract pitches for the certain audio component from the separation image data and perform digitalization of musical scores on the extracted pitches. The separation unit 230 may light keys for a melody line corresponding to the vocal pitches simultaneously with emitting sounds for the generated musical score data as a musical piece using a normal sequencer reproduction scheme.

Figure 11:
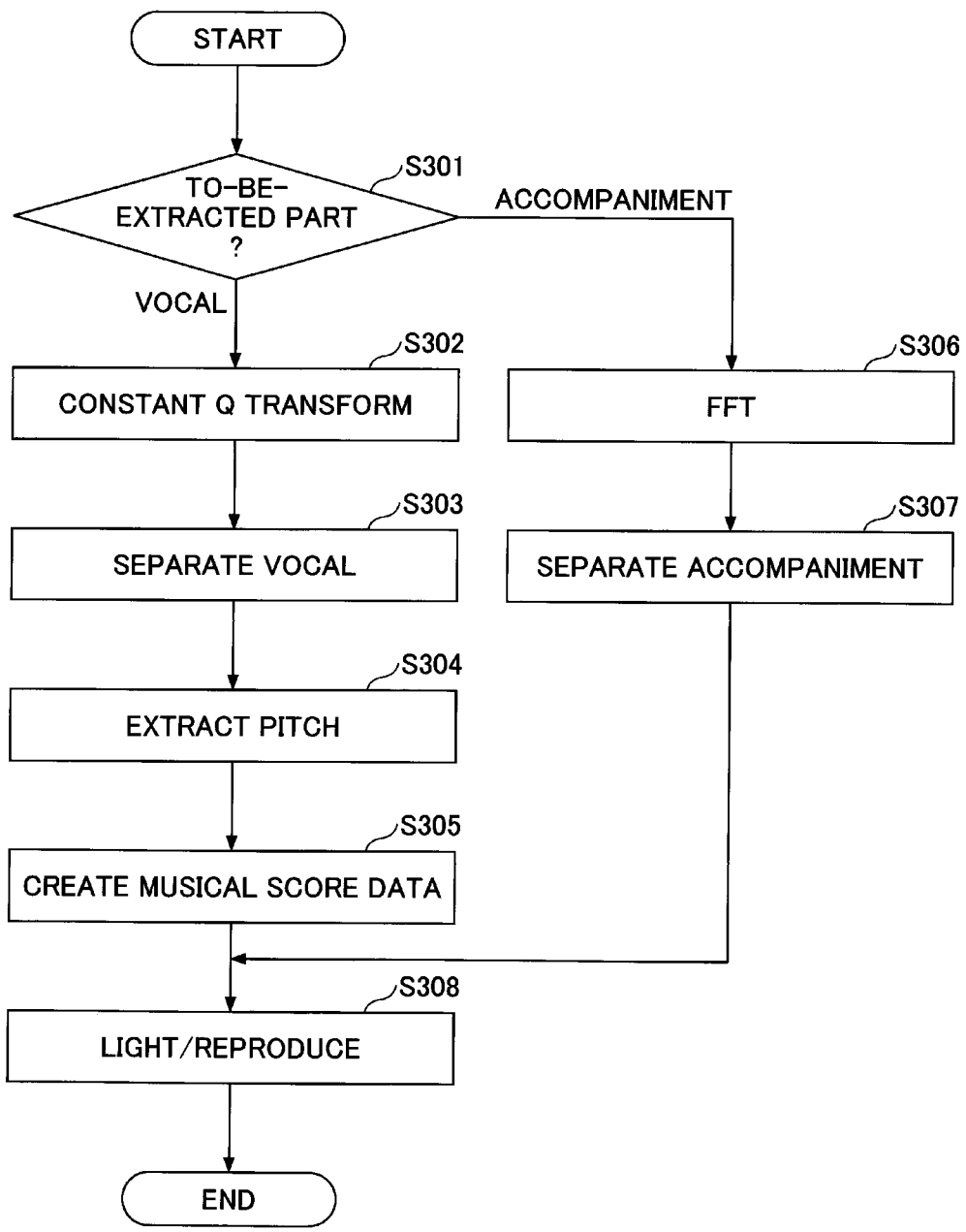
FIG. 11 is a flowchart for illustrating an audio operation performed by an electronic instrumental apparatus according to one embodiment of the present disclosure.

FIG. 11 is a flowchart for illustrating an audio operation with an electronic instrumental apparatus according to one embodiment of the present disclosure. The electronic instrumental apparatus 300 includes the audio source separation apparatus 200 including a trained audio source separation model for separating vocal audio data from mixture audio data consisting of mixture of an accompaniment sound and a vocal sound and a trained audio source separation model for separating accompaniment audio data from the mixture audio data.

At step S301, the electronic instrumental apparatus 300 determines whether a tobe-extracted part corresponds to a vocal sound or an accompaniment sound. For example, the to-be-extracted part may be specified by a user.

If the to-be-extracted part corresponds to the vocal sound (S301: vocal), at step S302, the electronic instrumental apparatus performs the constant Q transform on incoming mixture audio data to acquire a mixture spectrogram.

At step S303, the electronic instrumental apparatus 300 supplies the mixture spectrogram to the trained audio source separation model for separating vocal audio data from the mixture audio data to acquire a separation spectrogram showing the vocal audio data.

At step S304, the electronic instrumental apparatus 300 extracts pitches from the separation spectrogram.

At step S305, the electronic instrumental apparatus 300 generates musical score data from the extracted pitches.

On the other hand, if the to-be-extracted part is the accompaniment sound (S301: accompaniment), at step S306, the electronic instrumental apparatus 300 performs Fourier transform on the incoming mixture audio data to acquire a mixture spectrogram.

At step S307, the electronic instrumental apparatus 300 supplies the mixture spectrogram to the trained audio source separation model for separating accompaniment audio data from the mixture audio data to acquire a separation spectrogram showing the accompaniment audio data and performs inverse Fourier transform on the acquired separation spectrogram to acquire accompaniment audio data.

At step S308, the electronic instrumental apparatus 300 lights keys in accordance with the musical score data generated at step S305 or the accompaniment audio data generated at step S307 and reproduces the audio data.

One aspect of the present disclosure relates to a training method or a training apparatus for causing a learning model stored in a memory to be trained, where at least one processor is configured to:

transform a first audio type of audio data into a first image type of image data, wherein a first audio component and a second audio component are mixed in the first audio type of audio data, and the first image type of image data corresponds to the first audio type of audio data and has one axis of multiple axes as a logarithmic frequency axis;

transform a second audio type of audio data into a second image type of image data, wherein the second audio type of audio data includes the first audio component without mixture of the second audio component, and the second image type of image data corresponds to the second audio type of audio data and has one axis of multiple axes as a logarithmic frequency axis; and perform machine learning on the learning model with training data including sets of the first image type of image data and the second image type of image data.

wherein the performing the machine learning on the learning model comprises training the learning model to generate second image data from first image data, and the first image data is image data that is of a same type as the first image type and different from the first image type of image data and is not included in the training data, and the second image data is of a same type as the second image type and different from the second image type of image data and is not included in the training data.

In one embodiment, at least one processor may be configured to acquire multiple pieces of training audio data each including a set of the first audio type of audio data and the second audio type of audio data, perform the transformation on the acquired multiple pieces of training audio data to generate multiple pieces of training image data each including a set of the first image type of image data and the second image type of image data, and train the learning model with the machine learning based on the generated multiple pieces of training image data.

In one embodiment, the first audio component and the second audio component may be audio components showing certain frequency distributions, and fundamental tones of the audio components may change while distributions of harmonic components of the fundamental tones may fall within certain ranges.

In one embodiment, the first audio component and the second audio component may be a certain type of instrumental sound or a vocal sound and be audio components that belong to an instrumental sound or a vocal sound having a same type of tone with different pitches.

In one embodiment, the transformation may be constant Q transform.

In one embodiment, the learning model may be implemented in a convolutional neural network including a convolutional layer to extract features for different local areas in image data and a layer to modify displacement across the local areas in the image data, and if audio data is transformed into image data having a logarithmic frequency axis and the image data is supplied to the convolutional neural network, for respective audio components in the audio data, pitch variations resulting from displacement in a frequency direction are allowed and differences between tones resulting from distributions of harmonic components for fundamental tones are extracted as the features.

In one embodiment, the neural network may be configured to include a formant as the feature.

In one embodiment, the convolutional neural network may further include a pooling layer to modify displacement across local areas in image data.

In one embodiment, at least one processor may be configured to train the model in accordance with GANs (Generative Adversarial Networks).

In one embodiment, the learning model may include a generator to generate new image data based on incoming image data and a discriminator to discriminate a difference between two pieces of image data, and at least one processor may supply the first image type of image data to the generator to acquire a third image type of image data from the generator, supply the second image type of image data and the third image type of image data to the discriminator, and train the generator based on respective output values acquired from the discriminator.

One aspect of the present disclosure relates to an audio source separation apparatus, including a memory that stores a trained model generated with machine learning and at least one processor, where at least one processor is configured to:

transform a first audio type of audio data into a first image type of image data, wherein a first audio component and a second audio component are mixed in the first audio type of audio data, and the first image type of image data corresponds to the first audio type of audio data and has one axis of multiple axes as a logarithmic frequency axis;

supply the transformed first image type of image data to the trained model;

acquire the second image type of image data from the trained model; and separate the first audio component based on the acquired second image type of image data.

In one embodiment, the trained model may be obtained by training a learning model, after using training data including the first audio type of audio data and the second audio type of audio data to transform the first audio type of audio data into the first image type of image data and the second audio type of audio data into the second image type of image data, to perform machine learning with training data including sets of the transformed first image type of image data and the transformed second image type of image data to generate image data that is of a same type as the second image type and is not included in the training data from image data that is of a same type as the first image type and is not included in the training data.

In one embodiment, the model may be implemented with a convolutional neural network including a convolutional layer to extract features for different local areas in image data.

In one embodiment, the separating the first audio component based on the second image type of image data may include extracting pitch information for the first audio component.

In one embodiment, the separating the first audio component based on the second image type of image data may include extracting a pitch of a fundamental tone for the first audio component.

In one embodiment, the transformation may be constant Q transform.

In one embodiment, at least one processor may be further configured to selectively perform either constant Q transform for transforming audio data into image data having a logarithmic frequency axis or Fourier transform for transforming audio data into image data having a linear frequency axis, and if the Fourier transform is selected, transform the first audio type of audio data into a third image type of image data having a linear frequency axis with the Fourier transform, supply the third image type of image data to the trained model to acquire a fourth image type of image data showing the first audio component without mixture of the second audio component from the trained model, and separate the first audio component based on the fourth image type of image data.

In one embodiment, at least one processor may be further configured to perform inverse Fourier transform on the acquired fourth image type of image data to acquire audio data resulting from separation of the first audio component and reproduce the acquired audio data.

In one embodiment, the Fourier transform may enable inverse Fourier transform to inversely transform transformed image data into audio data, and it may be harder for the constant Q transform to inversely transform transformed image data into audio data than the Fourier transform does.

In one embodiment, at least one processor may be configured to, if the tobe-separated audio component is reproduced, perform Fourier transform on the first audio type of audio data, and if the to-be-separated audio component is not reproduced, perform constant Q transform on the first audio type of audio data.

In one embodiment, the first audio type of audio data may include an audio component corresponding to a vocal sound and an audio component corresponding to an accompaniment sound, and the audio component corresponding to the vocal sound may be separated as the first audio component.

In one embodiment, the first audio type of audio data may include an audio component corresponding to a vocal sound and an audio component corresponding to an accompaniment sound, and the audio component corresponding to the accompaniment sound may be separated as the first audio component.

One aspect of the present disclosure relates to an electronic instrument having a keyboard wherein respective keys are luminescent, including a memory that stores a trained model generated with machine learning and at least one processor configured to: transform a first audio type of audio data into a first image type of image data, wherein a first audio component and a second audio component are mixed in the first audio type of audio data, and the first image type of image data corresponds to the first audio type of audio data and has one axis of multiple axes as a logarithmic frequency axis, supply the transformed first image type of image data to the trained model to acquire the second image type of image data from the trained model, separate the first audio component based on the acquired second image type of image data, and light keys on the keyboard in accordance with the separated first audio component.

One aspect of the present disclosure relates to an audio source separation model generation apparatus, including a memory that stores a learning model to be trained with machine learning and at least one processor, where at least one processor is configured to:

acquire training data including a first audio type of audio data and a second audio type of audio data, wherein a first audio component and a second audio component are mixed in the first audio type of audio data, and the second audio type of audio data includes the first audio component without mixture of the second audio component;

transform the acquired first audio type of audio data into a first image type of image data;

transform the acquired second audio type of audio data into a second image type of image data; and generate a trained model to supply second image data from first image data by machine learning with training data including sets of the transformed first image type of image data and the transformed second image type of image data, wherein the first image data is of a same type as the first image type and is not included in the training data, and the second image data is of a same type as the second image type and is not included in the training data.

One aspect of the present disclosure relates to an audio source separation method for separating audio with a trained model stored in a memory, comprising:

acquiring, by at least one processor, a first audio type of audio data, wherein a first audio component and a second audio component are mixed in the first audio type of audio data;

transforming, by at least one processor, the acquired first audio type of audio data into a first image type of image data, wherein the first image type of image data corresponds to the first audio type of audio data and has one axis of multiple axes as a logarithmic frequency axis;

supplying, by at least one processor, the transformed first image type of image data to the trained model;

acquiring, by at least one processor, the second image type of image data from the trained model; and separating, by at least one processor, the first audio component based on the acquired second image type of image data.

In one aspect of the present disclosure, a program for causing at least one processor to perform the above-stated method and a computer readable storage medium are provided.

Although the embodiments of the present disclosure have been described above, the present disclosure is not limited to the above-stated specific embodiments, and various modifications and changes can be made within the spirit and scope of the present disclosure as defined by claims as attached.

The invention claimed is:

1. A machine learning method for training a learning model, comprising:

transforming, by at least one processor, a first type of audio data into a first type of image data, wherein a first audio component and a second audio component are mixed in the first type of audio data, and the first imago type of image data corresponds to the first type of audio data and has one axis of multiple axes as a logarithmic frequency axis;

transforming, by at least one processor, a second type of audio data into a second type of image data, wherein the second type of audio data includes the first audio component without mixture of the second audio component, and the second type of image data corresponds to the second type of audio data and has one axis of multiple axes as a logarithmic frequency axis; and performing, by at least one processor, machine learning on the learning model with training data including sets of the first type of image data and the second type of image data, wherein:

the learning model is implemented with a convolutional neural network including a convolutional layer to extract features of different local areas in image data and a layer to modify displacement across the local areas in the image data, and when audio data is transformed into image data having a logarithmic frequency axis and the image data is supplied to the convolutional neural network, for respective audio components in the audio data, pitch variations resulting from displacement in a frequency direction are allowed and differences between tones resulting from distributions of harmonic components for fundamental tones are extracted as the features.

2. The machine learning method as claimed in claim 1, further comprising:

acquiring, by at least one processor, multiple pieces of training audio data each including a set of the first type of audio data and the second type of audio data;

performing, by at least one processor, the transformation on the acquired multiple pieces of training audio data to generate multiple pieces of training image data each including a set of the first type of image data and the second type of image data; and training, by at least one processor, the learning model with the machine learning based on the generated multiple pieces of training image data.

3. The machine learning method as claimed in claim 1, wherein the first audio component and the second audio component are audio components showing certain frequency distributions, and fundamental tones of the audio components change while distributions of harmonic components of the fundamental tones fall within certain ranges.

4. The machine learning method as claimed in claim 1, wherein the first audio component and the second audio component are a certain type of instrumental sound or a vocal sound and are audio components that belong to an instrumental sound or a vocal sound having a same type of tone with different pitches.

5. The machine learning method as claimed in claim 1, wherein the learning model includes a generator that generates new image data based on incoming image data and a discriminator that discriminates a difference between two pieces of image data, and wherein at least one processor supplies the first type of image data to the generator to acquire a third type of image data from the generator, supplies the second type of image data and the third type of image data to the discriminator, and trains the generator based on respective output values acquired from the discriminator.

6. The machine learning method as claimed in claim 1, wherein the performing the machine learning on the learning model comprises training the learning model to generate second image data from first image data, wherein the first image data is of the first type while different from the first type of image data included in the training data, and the second image data is of the second type while different from the second type of image data included in the training data.

7. An audio source separation apparatus, comprising:
at least one processor,
wherein at least one processor is configured to:
selectively perform one of a first transformation and a second transformation depending on a to-be-separated audio component, wherein the first transformation comprises transforming audio data into image data having a logarithmic frequency axis, and the second transformation comprises transforming audio data into image data having a linear frequency axis;
transform, when the first transformation is selected, a first type of audio data into a first type of image data, wherein a first audio component and a second audio component are mixed in the first type of audio data, and the first type of image data corresponds to the first type of audio data and has one axis of multiple axes as the logarithmic frequency axis;
supply the transformed first type of image data to a trained model generated by machine learning;
acquire a second type of image data from the trained model;
separate the first audio component based on the acquired second type of image data;
transform, when the second transformation is selected, the first type of audio data into a third type of image data having a linear frequency axis; and
supply the third type of image data to the trained model, acquire a fourth type of image data from the trained model, the fourth type of image data showing the first audio component without mixture of the second audio component, and separate the first audio component based on the fourth type of image data.

8. The audio source separation apparatus as claimed in claim 7, wherein the trained model is obtained by training a learning model, after using training data including the first type of audio data and the second type of audio data to:
transform the first type of audio data into the first type of image data and the second type of audio data into the second type of image data, and
perform machine learning with training data including sets of the transformed first type of image data and the transformed second type of image data to generate image data that is of as the second type and not included in the training data, from image data that is of the first type and not included in the training data.

9. The audio source separation apparatus as claimed in claim 7, wherein the separating the first audio component based on the second type of image data comprises extracting pitch information for the first audio component.

10. The audio source separation apparatus as claimed in claim 9, wherein the separating the first audio component based on the second type of image data comprises extracting a pitch of a fundamental tone for the first audio component.

11. The audio source separation apparatus as claimed in claim 7, wherein the separating the first audio component based on the second type of image data comprises transforming the second type of image data into the second type of audio data.

12. The audio source separation apparatus as claimed in claim 7, wherein the at least one processor is configured to perform inverse Fourier transform on the acquired fourth type of image data to acquire audio data and reproduce the acquired audio data, the audio data resulting from separation of the first audio component.

13. The audio source separation apparatus as claimed in claim 7, wherein the at least one processor is configured to, if the to-be-separated audio component is reproduced, perform Fourier transform on the first type of audio data, and if the to-be-separated audio component is not reproduced, perform constant Q transform on the first type of audio data.

14. The audio source separation apparatus as claimed in claim 7, wherein the first type of audio data includes an audio component corresponding to a vocal sound and an audio component corresponding to an accompaniment sound, and the audio component corresponding to the vocal sound is separated as the first audio component.

15. The audio source separation apparatus as claimed in claim 7, wherein the first type of audio data includes an audio component corresponding to a vocal sound and an audio component corresponding to an accompaniment sound, and the audio component corresponding to the accompaniment sound is separated as the first audio component.

16. The machine learning method as claimed in claim 7, wherein the first transformation is constant Q transform; and
wherein the second transformation is Fourier transform.

17. An electronic instrument having a keyboard wherein respective keys are luminescent, comprising:
at least one processor configured to:
selectively perform one of a first transformation and a second transformation depending on a to-be-separated audio component, wherein the first transformation comprises transforming audio data into image data having a logarithmic frequency axis, and the second transformation comprises transforming audio data into image data having a linear frequency axis,
transform, when the first transformation is selected, a first type of audio data into a first type of image data, wherein a first audio component and a second audio component are mixed in the first type of audio data, and the first type of image data corresponds to the first type of audio data and has one axis of multiple axes as the logarithmic frequency axis,
supply the transformed first type of image data to a trained model generated by machine learning, to acquire a second type of image data from the trained model, and separate the first audio component based on the acquired second type of image data,
transform, when the second transformation is selected, the first type of audio data into a third type of image data having a linear frequency axis, supply the third type of image data to the trained model, acquire a fourth type of image data from the trained model, the fourth type of image data showing the first audio component without mixture of the second audio component, and separate the first audio component based on the fourth type of image data, and
light keys on the keyboard in accordance with the separated first audio component.

* * * * *

UNITED STATES PATENT AND TRADEMARK OFFICE
CERTIFICATE OF CORRECTION

| | |
|---|---|
| PATENT NO. | : 11,568,857 B2 |
| APPLICATION NO. | : 16/979594 |
| DATED | : January 31, 2023 |
| INVENTOR(S) | : Daiki Higurashi |

It is certified that error appears in the above-identified patent and that said Letters Patent is hereby corrected as shown below:

In the Claims

Column 16, Line 4 (Claim 1), delete "imago" and insert -- image --.

Column 17, Line 54 (Claim 8), delete "as" after "is of".

Column 18, Line 29 (Claim 16), delete "claim 7" and insert -- claim 1 --.

Signed and Sealed this
Sixteenth Day of May, 2023

*Katherine Kelly Vidal*

Katherine Kelly Vidal
*Director of the United States Patent and Trademark Office*